(12) United States Patent
Branagan et al.

(10) Patent No.: US 8,474,541 B2
(45) Date of Patent: Jul. 2, 2013

(54) GLASS FORMING HARDBANDING MATERIAL

(75) Inventors: Daniel James Branagan, Idaho Falls, ID (US); Brian E. Meacham, Idaho Falls, ID (US); William D. Kiilunen, Rigby, ID (US); James N. Milloway, Idaho Falls, ID (US); Brian D. Merkle, Idaho Falls, ID (US)

(73) Assignee: The NanoSteel Company, Inc., Providence, RI (US)

( * ) Notice: Subject to any disclaimer, the term of this patent is extended or adjusted under 35 U.S.C. 154(b) by 428 days.

(21) Appl. No.: 12/917,343

(22) Filed: Nov. 1, 2010

(65) Prior Publication Data

US 2011/0100720 A1     May 5, 2011

Related U.S. Application Data

(60) Provisional application No. 61/256,465, filed on Oct. 30, 2009.

(51) Int. Cl.
*E21B 19/16*      (2006.01)

(52) U.S. Cl.
USPC ................ 166/380; 166/77.51; 166/242.6

(58) Field of Classification Search
USPC ............. 166/380, 77.51, 242.6; 428/323, 428/325, 697, 698, 699, 704; 138/109, 155; 285/288.1
See application file for complete search history.

(56) References Cited

U.S. PATENT DOCUMENTS

| | | | |
|---|---|---|---|
| 5,194,221 A * | 3/1993 | Culling | ................... 420/53 |
| 6,375,895 B1 | 4/2002 | Daemen et al. | |
| 6,474,411 B1 | 11/2002 | Castro | |
| 2004/0206726 A1 | 10/2004 | Daemen et al. | |
| 2006/0102354 A1 | 5/2006 | Gammage et al. | |
| 2007/0029295 A1 | 2/2007 | Branagan et al. | |
| 2007/0187369 A1 | 8/2007 | Menon et al. | |
| 2007/0267390 A1 | 11/2007 | Jiang et al. | |

OTHER PUBLICATIONS

Chan et al., "Evolution of Drilling Programs and Complex Well Profiles Drive Development of Fourth-Generation Hardband Technolog," IADC/SPE 112740, 2008 (3 pages).
International Search Report and Written Opinion dated Jan. 11, 2011 issued in International Patent Application No. PCT/US10/55001.

* cited by examiner

*Primary Examiner* — Cathleen Hutchins
(74) *Attorney, Agent, or Firm* — Grossman, Tucker, Perreault & Pfleger, PLLC

(57) ABSTRACT

A drill pipe and a method of applying hardbanding thereto. A hardbanding alloy comprising iron and manganese present in the range of 67 to 87 weight percent (wt. %), niobium and chromium present in the range of 9 to 29 wt. %, and boron, carbon and silicon present in the range of 3 to 6.5 wt. % may be welded around at least a portion of a tool joint circumference. The hardbanding alloy may exhibit a hardness of 45 Rc to 70 Rc and a wear rate in the range of 0.08 grams to 1.60 grams of mass loss after 6,000 cycles as measured using ASTM G65-04, Procedure A.

17 Claims, 10 Drawing Sheets

US 8,474,541 B2

GLASS FORMING HARDBANDING MATERIAL

CROSS-REFERENCE TO RELATED APPLICATIONS

The present application claims the benefit of the filing date of U.S. Provisional Application No. 61/256,465, filed on Oct. 30, 2009, the teachings of which are incorporated herein by reference.

FIELD OF INVENTION

The present disclosure relates to glass forming chemistries which may be provided as feedstocks for weld overlay hardfacing and forming protective surfaces, which in particular, may be applied to the surface of a tool joint for protection of the tool joint in, for example, oil and gas drilling operations.

BACKGROUND

Hardfacing materials applied to drill stems have been utilized in the oil industry since its origins, which may have been around the late 1930's. The first hardband materials consisted of a mild steel matrix with crushed sintered tungsten carbide particles. These materials performed relatively well for more than half a century as the relatively simple vertical, shallow wells in which they were employed did not put many requirements on the hardfacing materials.

Initially, hardband was designed to protect drill stem elements from rotational wear and to extend their life as casing wear was not an issue for vertical holes. As wells became deeper and deviated with more complicated well designs, an increasing number of casing failures started to become common. Today, the need to reach deeper more remote hydrocarbon reservoirs appears to have pushed the limits of traditional drilling programs. The shallow, easy formations are becoming depleted and focus has begun to turn to deeper, more remote, and challenging reservoirs.

Since the oil industry's beginnings, drill pipe has been used to drill wells and more recently, its material requirements including, mechanical properties, capabilities, and performance, have evolved in response to the evolution of the newer drilling challenges. Maintaining drill pipe integrity is relatively important for both the drilling contractor and the well operator.

Thus, a need to develop casing friendly hardfacing materials that extend the life of the drill pipe while at the same time protecting the casing has been appreciated. For decades the industry has used traditional materials such as tungsten carbide (WC), chrome carbide, and other alloying overlays to improve the abrasion resistance on tool joint components. Typical materials may be good at protecting either the drill pipe or the casing but typically are not understood to protect both. Materials such as tungsten carbide (W) based overlays have performed well in open-hole situations but may dramatically reduce casing life. Chrome carbide overlays may work relatively well in preventing casing wear but provide relatively limited tool joint protection. Other factors that may be considered include, but are not limited to, application, performance and longevity of the hardfacing material.

In addition to relatively improved hardness and wear resistance, it may be appreciated that it would be desirable to make materials that are crack free. Cracks once initiated during welding may potentially cause issues. Some of the perceived worst type of cracks may include those formed in the underbead or longitudinal cracking which can produce overlay failure from chipping and/or spallation. Typical transverse cracks or cross checking cracks may be less problematic and may usually be blunted by the ductile substrate. However, during the lifetime of the tool joint, these cracks may cause some issues when drilling complex drill profiles.

In order to meet various industrial requirements for an advanced hardbanding material, it may be advantageous to reduce the scale of the microstructure of the material. Such reduction may lead to relatively higher hardness and wear resistance in combination with relatively higher toughness and improved crack resistance. The utilization of glass forming chemistries may be beneficial in refining the scale of the crystalline microstructure, especially during welding where high heat input and slow cooling rates may result in the formation of coarse metallurgical structures. The level of refinement may depend on a variety of factors including, for example, the glass forming ability of the alloy, the cooling rate of the industrial processing method, the total heat input, the thickness of the weld overlay deposit, etc. In the relatively extreme case, the average cooling rate of the industrial welding process may be greater (i.e. faster) than the critical cooling rate for metallic glass formation of the feedstock material, and metallic glass weld deposits formed during welding. If the total heat input is insufficient to cause devitrification, metallic glass overlays may be formed with an angstrom scale microstructure, but if the total heat input is too great, then partially or complete devitrification may occur resulting in the formation of a nanoscale composite microstructure.

Alternatively, if the critical cooling rate for metallic glass formation is greater than the average cooling rate of the chosen industrial weld overlay process, high undercoolings may still be obtained prior to nucleation and growth. Undercooling may be understood as the cooling of a liquid below its equilibrium freezing temperature while the material remains liquid. The undercooling, which may be many hundreds of degrees greater than that obtained in conventional alloys, may result in relatively higher driving forces for nucleation and combined with a simultaneous reduction in the temperature dependant diffusional processes, may result in an increased nucleation frequency and reduced time for grain/phase growth. Thus, as the level of undercooling is increased, the resulting average grain/phase size may be reduced. This reduction of both matrix grain/phase sizes and hard particle sizes may result in an increase in weld overlay toughness since relatively less stress concentration may occur in individual particles and any cracks produced in a hard brittle phase may be arrested/bridged in the more ductile matrix phases.

SUMMARY

An aspect of the present disclosure relates to a method of applying a hardband to a drill pipe. The method may include welding around at least a portion of the tool joint circumference a hardbanding alloy comprising iron and manganese present in the range of 67 to 87 weight percent (wt. %), niobium and chromium present in the range of 9 to 29 wt. %, and boron, carbon and silicon present in the range of 3 to 6.5 wt. %. The method may also include cooling the hardbanding alloy, wherein the hardbanding alloy as welded exhibits a hardness of 45 Rc to 70 Rc and a wear rate in the range of 0.08 grams to 1.60 grams of mass loss after 6,000 cycles as measured using ASTM G65-04, Procedure A. The hardbanding alloy may be cooled at a rate sufficient to produce a hardband including alpha-iron and/or gamma-iron phases in the range of 0.05 µm to 50 µm in size. The method may also include preheating a tool joint at a temperature of 275° C. or greater for a period of 0.01 hours to 100 hours.

Another aspect of the present disclosure relates to a drill pipe. The drill pipe may include a tool joint having a circumference and a hardband including a hardbanding alloy disposed around at least a portion of the circumference of the tool joint. The hardbanding alloy may include iron and manganese present in the range of 67 to 87 weight percent (wt. %), niobium and chromium present in the range of 9 to 29 wt. %, and boron, carbon and silicon present in the range of 3 to 6.5 wt. %, wherein the hardbanding alloy exhibits a hardness of 45 Rc to 70 Rc and a wear rate in the range of 0.08 grams to 1.60 grams of mass loss after 6,000 cycles as measured using ASTM G65-04, Procedure A. The hardbanding alloy may also exhibit alpha-iron and/or gamma-iron phases in the range of 0.05 μm to 50 μm in size as applied to the tool joint.

BRIEF DESCRIPTION OF DRAWINGS

The above-mentioned and other features of this disclosure, and the manner of attaining them, may become more apparent and better understood by reference to the following description of embodiments described herein taken in conjunction with the accompanying drawings, wherein.

DETAILED DESCRIPTION

Figure 1:
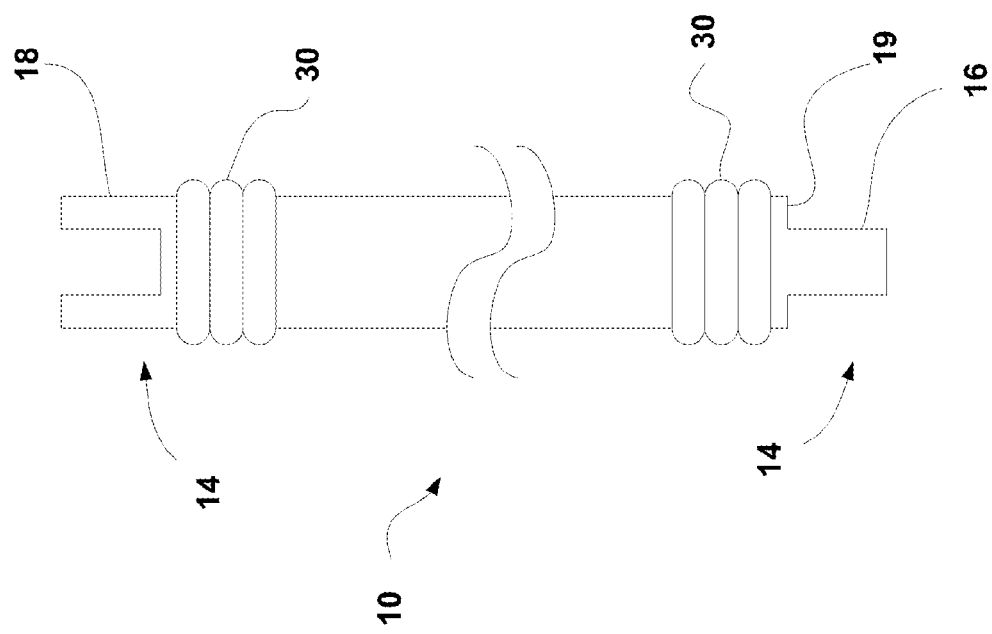
FIG. 1 illustrates an example of a drill pipe including a tool joint.

The present disclosure relates to glass forming chemistries and feedstocks prepared from chemistries providing protective surfaces through weld overlay hardfacing. Relatively high hardness, wear resistance and crack resistance may be observed in the overlay, which, without being limited to a specific theory, appears to have been enabled by vast reductions in microstructural scale. The chemistries may be applied to the surface of a tool joints for protection of the tool joint in, for example, oil and gas drilling operations. The chemistries may result in little to no cracking in the deposited overlay hardfacing.

The alloys contemplated herein are iron based glass forming alloys. Glass forming may be understood as alloys that may exhibit an amorphous or relatively amorphous structure having little to no short range order. That is, ordered associates between atoms are less than 1 nm in length in at least one or more dimensions, including all dimensions. Such level of disorder may be provided in undercooling the alloys. Undercooling may be understood as the cooling of a liquid below its equilibrium freezing temperature while the material remains liquid. The undercooling of the glass forming alloys, may be many hundreds of degrees greater than that obtained in conventional alloys and may result in relatively higher driving forces for nucleation and combined with a simultaneous reduction in the temperature dependant diffusional processes, may result in an increased nucleation frequency and reduced time for grain/phase growth. Thus, as the level of undercooling is increased, the resulting average grain/phase size may be reduced.

As noted above, utilization of glass forming chemistries may be beneficial in refining the scale of the crystalline microstructure. The level of refinement may depend on a variety of factors including, for example, the glass forming ability of the alloy, the cooling rate of the industrial processing method, the total heat input, the thickness of the weld overlay deposit, etc. The reduction of both matrix grain/phase sizes and hard particle sizes may result in an increase in weld overlay toughness since relatively less stress concentration may occur in individual particles and any cracks produced in a hard brittle phase may be arrested/bridged in the more ductile matrix phases.

In one embodiment, the alloys may include iron and manganese present in the range of 67 to 87 weight percent (wt. %); niobium and chromium present in the range of 9 to 29 wt. %; and boron, carbon and silicon present in the range of 3 to 6.5 wt. %. In another embodiment, the alloys may include iron present in the range of 67.0 to 86.0 wt. %, manganese present in the range of 0.05 to 0.3 wt. %, niobium present in the range of 3.5 to 6.0 wt. %, chromium present in the range of 6.0 to 23.0 wt. %, boron present in the range of 2.5 to 4.5 wt. %, carbon present in the range of 0.5 to 2 wt. %, and silicon present in the range of 0.2 to 0.5 wt. %. In yet a further embodiment, the alloys may include iron present in the range of 67.3 wt. % to 86.0 wt. %, manganese present in the range of 0.10 to 0.27 wt. %, niobium present in the range of 3.6 to 5.9 wt. %, chromium present in the range of 6.4 to 22.9 wt. %, boron present in the range of 2.5 to 4.2 wt. %, carbon present in the range of 0.7 to 1.2 wt. %, and silicon present in the range of 0.25 to 0.5 wt. %.

The various compositional ranges may include any value or increment located within the range. For example, iron may be present at a value of 67.0 wt. %, 67.1 wt. %, 67.2 wt. %, 67.3 wt. %, 67.4 wt. %, 67.5 wt. %, 67.6 wt. %, 67.7 wt. %, 67.8 wt. %, 67.9 wt. %, 68.0 wt. %, 68.1 wt. %, 68.2 wt. %, 68.3 wt. %, 68.4 wt. %, 68.5 wt. %, 68.6 wt. %, 68.7 wt. %, 68.8 wt. %, 68.9 wt. %, 69.0 wt. %, 69.1 wt. %, 69.2 wt. %, 69.3 wt. %, 69.4 wt. %, 69.5 wt. %, 69.6 wt. %, 69.7 wt. %, 69.8 wt. %, 69.9 wt. %, 70.0 wt. %, 70.1 wt. %, 70.2 wt. %, 70.3 wt. %, 70.4 wt. %, 70.5 wt. %, 70.6 wt. %, 70.7 wt. %, 70.8 wt. %, 70.9 wt. %, 71.0 wt. %, 71.1 wt. %, 71.2 wt. %, 71.3 wt. %, 71.4 wt. %, 71.5 wt. %, 71.6 wt. %, 71.7 wt. %, 71.8 wt. %, 71.9 wt. %, 72.0 wt. %, 72.1 wt. %, 72.2 wt. %, 72.3 wt. %, 72.4 wt. %, 72.5 wt. %, 72.6 wt. %, 72.7 wt. %, 72.8 wt. %, 72.9 wt. %, 73.0 wt. %, 73.1 wt. %, 73.2 wt. %, 73.3 wt. %, 73.4 wt. %, 73.5 wt. %, 73.6 wt. %, 73.7 wt. %, 73.8 wt. %, 73.9 wt. %, 74.0 wt. %, 74.1 wt. %, 74.2 wt. %, 74.3 wt. %, 74.4 wt. %, 74.5 wt. %, 74.6 wt. %, 74.7 wt. %, 74.8 wt. %, 74.9 wt. %, 75.0 wt. %, 75.1 wt. %, 75.2 wt. %, 75.3 wt. %, 75.4 wt. %, 75.5 wt. %, 75.6 wt. %, 75.7 wt. %, 75.8 wt. %, 75.9 wt. %, 76.0 wt. %, 76.1 wt. %, 76.2 wt. %, 76.3 wt. %, 76.4 wt. %, 76.5 wt. %, 76.6 wt. %, 76.7 wt. %, 76.8 wt. %, 76.9 wt. %, 77.0 wt. %, 77.1 wt. %, 77.2 wt. %, 77.3 wt. %, 77.4 wt. %, 77.5 wt. %, 77.6 wt. %, 77.7 wt. %, 77.8 wt. %, 77.9 wt. %, 78.0 wt. %, 78.1 wt. %, 78.2 wt. %, 78.3 wt. %, 78.4 wt. %, 78.5 wt. %, 78.6 wt. %, 78.7 wt. %, 78.8 wt. %, 78.9 wt. %, 79.0 wt. %, 79.1 wt. %, 79.2 wt. %, 79.3 wt. %, 79.4 wt. %, 79.5 wt. %, 79.6 wt. %, 79.7 wt. %, 79.8 wt. %, 79.9 wt. %, 80.0 wt. %, 80.1 wt. %, 80.2 wt. %, 80.3 wt. %, 80.4 wt. %, 80.5 wt. %, 80.6 wt. %, 80.7 wt. %, 80.8 wt. %, 80.9 wt. %, 81.1 wt. %, 81.2 wt. %, 81.3 wt. %, 81.4 wt. %, 81.5 wt. %, 81.6 wt. %, 81.7 wt. %, 81.8 wt. %, 81.9 wt. %, 82 wt. %, 82.1 wt. %, 82.2 wt. %, 82.3 wt. %, 82.4 wt. %, 82.5 wt. %, 82.6 wt. %, 82.7 wt. %, 82.8 wt. %, 82.9 wt. %, 83 wt. %, 83.1 wt. %, 83.2 wt. %, 83.3 wt. %, 83.4 wt. %, 83.5 wt. %, 83.6 wt. %, 83.7 wt. %, 83.8 wt. %, 83.9 wt. %, 84 wt. %, 84.1 wt. %, 84.2 wt. %, 84.3 wt. %, 84.4 wt. %, 84.5 wt. %, 84.6 wt. %, 84.7 wt. %, 84.8 wt. %, 84.9 wt. %, 85 wt. %, 85.1 wt. %, 85.2 wt. %, 85.3 wt. %, 85.4 wt. %, 85.5 wt. %, 85.6 wt. %, 85.7 wt. %, 85.8 wt. %, 85.9 wt. %, 86 wt. %, 86.1 wt. %, 86.2 wt. %, 86.3 wt. %, 86.4 wt. %, 86.5 wt. %, 86.6 wt. %, 86.7 wt. %, 86.8 wt. %, 86.9 wt. %, and/or 87 wt. %. Manganese may be present at a value of 0.05 wt. %, 0.06 wt. %, 0.07 wt. %, 0.08 wt. %, 0.09 wt. %, 0.10 wt. %, 0.11 wt. %, 0.12 wt. %, 0.13 wt. %, 0.14 wt. %, 0.15 wt. %, 0.16 wt. %, 0.17 wt. %, 0.18 wt. %, 0.19 wt. %, 0.20 wt. %, 0.21 wt. %, 0.22 wt. %, 0.23 wt. %, 0.24 wt. %, 0.25 wt. %, 0.26 wt. %, 0.27 wt. %, 0.28 wt. %, 0.29 wt. %, and/or 0.30 wt. %. Niobium may be present at a value of 3.50 wt. %, wt. %, 3.51 wt. %, 3.52 wt. %, 3.53 wt. %, 3.54 wt. %, 3.55 wt. %, 3.56 wt. %, 3.57 wt. %, 3.58 wt. %, 3.59 wt. %, 3.6 wt. %, 3.61 wt. %, 3.62 wt. %, 3.63 wt. %, 3.64 wt. %, 3.65 wt. %, 3.66 wt. %, 3.67 wt. %, 3.68 wt. %, 3.69 wt. %, 3.7 wt. %, 3.71 wt. %, 3.72 wt. %, 3.73 wt. %, 3.74 wt. %, 3.75 wt. %, 3.76 wt. %, 3.77 wt. %, 3.78 wt. %, 3.79 wt. %, 3.8 wt. %, 3.81 wt. %, 3.82 wt. %, 3.83 wt. %, 3.84 wt. %, 3.85 wt. %, 3.86 wt. %, 3.87 wt. %, 3.88 wt. %, 3.89 wt. %, 3.9 wt. %, 3.91 wt. %, 3.92 wt. %, 3.93 wt. %, 3.94 wt. %, 3.95 wt. %, 3.96 wt. %, 3.97 wt. %, 3.98 wt. %, 3.99 wt. %, 4 wt. %, 4.01 wt. %, 4.02 wt. %, 4.03 wt. %, 4.04 wt. %, 4.05 wt. %, 4.06 wt. %, 4.07 wt. %, 4.08 wt. %, 4.09 wt. %, 4.1 wt. %, 4.11 wt. %, 4.12 wt. %, 4.13 wt. %, 4.14 wt. %, 4.15 wt. %, 4.16 wt. %, 4.17 wt. %, 4.18 wt. %, 4.19 wt. %, 4.2 wt. %, 4.21 wt. %, 4.22 wt. %, 4.23 wt. %, 4.24 wt. %, 4.25 wt. %, 4.26 wt. %, 4.27 wt. %, 4.28 wt. %, 4.29 wt. %, 4.3 wt. %, 4.31 wt. %, 4.32 wt. %, 4.33 wt. %, 4.34 wt. %, 4.35 wt. %, 4.36 wt. %, 4.37 wt. %, 4.38 wt. %, 4.39 wt. %, 4.4 wt. %, 4.41 wt. %, 4.42 wt. %, 4.43 wt. %, 4.44 wt. %, 4.45 wt. %, 4.46 wt. %, 4.47 wt. %, 4.48 wt. %, 4.49 wt. %, 4.5 wt. %, 4.51 wt. %, 4.52 wt. %, 4.53 wt. %, 4.54 wt. %, 4.55 wt. %, 4.56 wt. %, 4.57 wt. %, 4.58 wt. %, 4.59 wt. %, 4.6 wt. %, 4.61 wt. %, 4.62 wt. %, 4.63 wt. %, 4.64 wt. %, 4.65 wt. %, 4.66 wt. %, 4.67 wt. %, 4.68 wt. %, 4.69 wt. %, 4.7 wt. %, 4.71 wt. %, 4.72 wt. %, 4.73 wt. %, 4.74 wt. %, 4.75 wt. %, 4.76 wt. %, 4.77 wt. %, 4.78 wt. %, 4.79 wt. %, 4.8 wt. %, 4.81 wt. %, 4.82 wt. %, 4.83 wt. %, 4.84 wt. %, 4.85 wt. %, 4.86 wt. %, 4.87 wt. %, 4.88 wt. %, 4.89 wt. %, 4.9 wt. %, 4.91 wt. %, 4.92 wt. %, 4.93 wt. %, 4.94 wt. %, 4.95 wt. %, 4.96 wt. %, 4.97 wt. %, 4.98 wt. %, 4.99 wt. %, 5 wt. %, 5.01 wt. %, 5.02 wt. %, 5.03 wt. %, 5.04 wt. %, 5.05 wt. %, 5.06 wt. %, 5.07 wt. %, 5.08 wt. %, 5.09 wt. %, 5.1 wt. %, 5.11 wt. %, 5.12 wt. %, 5.13 wt. %, 5.14 wt. %, 5.15 wt. %, 5.16 wt. %, 5.17 wt. %, 5.18 wt. %, 5.19 wt. %, 5.2 wt. %, 5.21 wt. %, 5.22 wt. %, 5.23 wt. %, 5.24 wt. %, 5.25 wt. %, 5.26 wt. %, 5.27 wt. %, 5.28 wt. %, 5.29 wt. %, 5.3 wt. %, 5.31 wt. %, 5.32 wt. %, 5.33 wt. %, 5.34 wt. %, 5.35 wt. %, 5.36 wt. %, 5.37 wt. %, 5.38 wt. %, 5.39 wt. %, 5.4 wt. %, 5.41 wt. %, 5.42 wt. %, 5.43 wt. %, 5.44 wt. %, 5.45 wt. %, 5.46 wt. %, 5.47 wt. %, 5.48 wt. %, 5.49 wt. %, 5.50 wt. %, 5.51 wt. %, 5.52 wt. %, 5.53 wt. %, 5.54 wt. %, 5.55 wt. %, 5.56 wt. %, 5.57 wt. %, 5.58 wt. %, 5.59 wt. %, and/or 6.00 wt. %. Chromium may be present at a value of 6.0 wt. %, 6.1 wt. %, 6.2 wt. %, 6.3 wt. %, 6.4 wt. %, 6.5 wt. %, 6.6 wt. %, 6.7 wt. %, 6.8 wt. %, 6.9 wt. %, 7 wt. %, 7.1 wt. %, 7.2 wt. %, 7.3 wt. %, 7.4 wt. %, 7.5 wt. %, 7.6 wt. %, 7.7 wt. %, 7.8 wt. %, 7.9 wt. %, 8 wt. %, 8.1 wt. %, 8.2 wt. %, 8.3 wt. %, 8.4 wt. %, 8.5 wt. %, 8.6 wt. %, 8.7 wt. %, 8.8 wt. %, 8.9 wt. %, 9.0 wt. %, 9.1 wt. %, 9.2 wt. %, 9.3 wt. %, 9.4 wt. %, 9.5 wt. %, 9.6 wt. %, 9.7 wt. %, 9.8 wt. %, 9.9 wt. %, 10.0 wt. %, 10.1 wt. %, 10.2 wt. %, 10.3 wt. %, 10.4 wt. %, 10.5 wt. %, 10.6 wt. %, 10.7 wt. %, 10.8 wt. %, 10.9 wt. %, 11.0 wt. %, 11.1 wt. %, 11.2 wt. %, 11.3 wt. %, 11.4 wt. %, 11.5 wt. %, 11.6 wt. %, 11.7 wt. %, 11.8 wt. %, 11.9 wt. %, 12.0 wt. %, 12.1 wt. %, 12.2 wt. %, 12.3 wt. %, 12.4 wt. %, 12.5 wt. %, 12.6 wt. %, 12.7 wt. %, 12.8 wt. %, 12.9 wt. %, 13.0 wt. %, 13.1 wt. %, 13.2 wt. %, 13.3 wt. %, 13.4 wt. %, 13.5 wt. %, 13.6 wt. %, 13.7 wt. %, 13.8 wt. %, 13.9 wt. %, 14.0 wt. %, 14.1 wt. %, 14.2 wt. %, 14.3 wt. %, 14.4 wt. %, 14.5 wt. %, 14.6 wt. %, 14.7 wt. %, 14.8 wt. %, 14.9 wt. %, 15.0 wt. %, 15.1 wt. %, 15.2 wt. %, 15.3 wt. %, 15.4 wt. %, 15.5 wt. %, 15.6 wt. %, 15.7 wt. %, 15.8 wt. %, 15.9 wt. %, 16.0 wt. %, 16.1 wt. %, 16.2 wt. %, 16.3 wt. %, 16.4 wt. %, 16.5 wt. %, 16.6 wt. %, 16.7 wt. %, 16.8 wt. %, 16.9 wt. %, 17.0 wt. %, 17.1 wt. %, 17.2 wt. %, 17.3 wt. %, 17.4 wt. %, 17.5 wt. %, 17.6 wt. %, 17.7 wt. %, 17.8 wt. %, 17.9 wt. %, 18.0 wt. %, 18.1 wt. %, 18.2 wt. %, 18.3 wt. %, 18.4 wt. %, 18.5 wt. %, 18.6 wt. %, 18.7 wt. %, 18.8 wt. %, 18.9 wt. %, 19.0 wt. %, 19.1 wt. %, 19.2 wt. %, 19.3 wt. %, 19.4 wt. %, 19.5 wt. %, 19.6 wt. %, 19.7 wt. %, 19.8 wt. %, 19.9 wt. %, 20.0 wt. %, 20.1 wt. %, 20.2 wt. %, 20.3 wt. %, 20.4 wt. %, 20.5 wt. %, 20.6 wt. %, 20.7 wt. %, 20.8 wt. %, 20.9 wt. %, 21.0 wt. %, 21.1 wt. %, 21.2 wt. %, 21.3 wt. %, 21.4 wt. %, 21.5 wt. %, 21.6 wt. %, 21.7 wt. %, 21.8 wt. %, 21.9 wt. %, 22.0 wt. %, 22.1 wt. %, 22.2 wt. %, 22.3 wt. %, 22.4 wt. %, 22.5 wt. %, 22.6 wt. %, 22.7 wt. %, 22.8 wt. %, 22.9 wt. % and/or 23.0 wt. %. Boron may be present at a value of 2.5 wt. %, 2.6 wt. %, 2.7 wt. %, 2.8 wt. %, 2.9 wt. %, 3.0 wt. %, 3.1 wt. %, 3.2 wt. %, 3.3 wt. %, 3.4 wt. %, 3.5 wt. %, 3.6 wt. %, 3.7 wt. %, 3.8 wt. %, 3.9 wt. %, 4.0 wt. %, 4.1 wt. %, 4.2 wt. %, 4.3 wt. %, 4.4 wt. % and/or 4.5 wt. %. Carbon may be present at a value of 0.5 wt. %, 0.6 wt. %, 0.7 wt. %, 0.8 wt. %, 0.9 wt. %, 1.0 wt. %, 1.1 wt. %, 1.2 wt. %, 1.3 wt. %, 1.4 wt. %, 1.5 wt. %, 1.6 wt. %, 1.7 wt. %, 1.8 wt. %, 1.9 wt. %, and/or 2.0 wt. %. Silicon may be present at a value of 0.20 wt. %, 0.21 wt. %, 0.22 wt. %, 0.23 wt. %, 0.24 wt. %, 0.25 wt. %, 0.26 wt. %, 0.27 wt. %, 0.28 wt. %, 0.29 wt. %, 0.30 wt. %, 0.31 wt. %, 0.32 wt. %, 0.33 wt. %, 0.34 wt. %, 0.35 wt. %, 0.36 wt. %, 0.37 wt. %, 0.38 wt. %, 0.39 wt. %, 0.40 wt. %, 0.41 wt. %, 0.42 wt. %, 0.43 wt. %, 0.44 wt. %, 0.45 wt. %, 0.46 wt. %, 0.47 wt. %, 0.48 wt. %, 0.49 wt. %, and/or 0.50 wt. %.

It may be appreciated that the alloys may incorporate the above elemental constituents at a total of 100 wt. %. In some embodiments, the alloys may be incorporated into other alloy compositions in the range of 70 wt % to 100 wt %, including all values and ranges therein. The alloys may include, may be limited to or may consist essentially of the above named elements. In addition, the alloys may include 2.0 wt. % or less of impurities. Impurities may be understood as elements or compositions that may be included in the alloys due to inclusion in the feedstock components, through introduction in the processing equipment, or by reaction of the alloy compositions with the environment.

The alloys may be formed by blending various feedstock materials together, which may then be melted in a hearth or furnace and formed into ingots. The ingots may be re-melted and flipped one or more times, which may increase homogeneity of the ingots. The ingots may then be melted and atomized or otherwise formed into an intermediate or final product. The forming process may occur in a relatively inert environment, including an inert gas. Inert gasses may include, for example, argon or helium.

If atomized, the alloys may be atomized by centrifugal, gas, or water atomization processes to produce powders of various sizes to include, but not be limited to, standard industrial cuts such as +53 to −106 μm, +53 to −150 μm, and +45 to −180 μm, which may be applied to a surface to provide a hard surface through various hardfacing strategies including but not limited to laser welding and plasma transferred arc welding (PTAW). In addition, the alloys may be formed into a cored wire of various diameters in the range of 1 mm to 5 mm, including all values and ranges therein, such as 1.2 mm, 1.6 mm, 2.8 mm, 3.2 mm, 4.7 mm, etc., which can be used to provide a hard surface through various hardfacing strategies including, but not limited to, gas metal arc-welding (GMAW), metal inert gas (MIG) welding, submerged arc welding, and open arc welding. Combinations of powders may be contained in conventional steel sheaths, which when melted may provide the targeted alloy composition. The steel sheaths may include plain carbon steel, low, medium, or high carbon steel, low alloy steel, or stainless steel sheeths. In some embodiments, the cored wire may contain flux which may allow for welding without a cover gas without porosity forming in the weld deposit. Furthermore, the alloys may be formed into a stick electrode of various diameters in the range of 1 mm to 5 mm, including all values and ranges therein, such as, but not limited to, 1.2 mm, 1.6 mm, 2.8 mm, 3.2 mm, 4.7 mm, etc., which may be welded through various hardfacing strategies including, but not limited to, shielded metal arc welding (SMAW) or stick welding.

The alloys may exhibit a primary onset devitrification temperature of 452° C. to 599° C., including all values and increments therein, and a primary peak devitrification temperature of 474° C. to 612° C., including all values and increments therein. In addition, the alloys may exhibit an onset melting temperature in the range of 1137° C. to 1202° C., including all values and increments therein and a peak melting temperature in the range of 1169° C. to 1227° C., including all values and increments therein. The devitrification and melting temperatures may be determined by differential scanning calorimetry or differential thermal analysis and may be measured at 10° C. per minute.

The alloys described above may be applied to various substrate surfaces, such as tool joints or other portions of drill pipes, which may include various steel alloys including A36, 4137 or 4140 steel, as well as other structural and/or tooling steels. Examples of alloys used in the substrates may include API E-75, API X-95, API G-105 and/or API S-135. In addition, alloys may be iron based alloys may include carbon, chromium, copper, manganese, molybdenum, phosphorous and/or silicon. For example, the substrate may include iron may be present at 95 atomic percent (at %) or more, carbon present at 0.2 atomic percent to 0.5 atomic percent, manganese present in the range of 0.5 atomic percent to 1.5 atomic percent, optionally copper present in the range of 0.1 atomic percent to 0.3 atomic percent, optionally chromium present in the range of 0.1 atomic percent to 2.0 atomic percent, optionally molybdenum may be present in the range of 0.1 atomic percent to 0.3 atomic percent, optionally silicon may be present in the range of 0.1 atomic percent to 0.4 atomic percent, optionally phosphorous may be present in the range of less than or equal to 0.04 atomic percent and optionally sulfur may be present in the range of less than 0.5 atomic percent. The values may be present at all values and ranges within the ranges presented above. In one embodiment, consistent with the above example, iron may be present at 97 atomic percent or greater, a transition metal such as one or more selected from chromium, molybdenum and copper, may be present at 2 atomic percent or less and a non-metal such as one or more selected from carbon, phosphorus and silicon may be present at 1 atomic percent or less. In some examples, the alloys may be used to provide a coating layer/hardfacing on tool surfaces, and in particular, tool joint surfaces. The hardness of the substrate materials may be varied widely from Rc 10 to Rc 60 and may be determined based on the need of the tool surface to sustain the structural load for the application. In some examples, the underlying substrate may have a Rockwell C hardness ($R_C$) of 40 and/or a Rockwell B ($R_B$) hardness of 110 or less, including all values and ranges in the range of $R_B$ of 60 to 110.

The surfaces upon which the alloys may be applied may be preheated at a temperature in the range of 275° C. or greater, such as in the range of 275° C. to 500° C., including all values and ranges therein. The surfaces may be preheated for 0.01 hours to 100 hours, including all values and ranges therein. It is noted that pre-heating may reduce or prevent cracking of the deposited welds.

As alluded to above, the alloys may be provided in the form of stick, wire, powder, cored wire, etc. and deposited on a surface using a number of welding techniques such as laser welding, shielded metal arc welding, stick welding, plasma transfer arc welding, gas metal arc-welding, metal inert gas welding, submerged arc welding, or open arc welding. The alloys may cool at a cooling rate in the range of 100 K/s to 5000 K/s, including all values and ranges therein. After deposition, the alloys may exhibit a density in the range of about 7.0 grams/cm$^3$ to 7.6 grams/cm$^3$, including all values and ranges therein, such as 7.32 grams/cm$^3$ to 7.59 grams/cm$^3$. The alloys may also exhibit an as deposited hardness of 45 Rc to 67 Rc, such as in the range of 47.9 Rc to 64.6 Rc, including all values and increments therein and may depend on the type of weld, the weld parameters and alloy chemistry. Furthermore, the alloys may exhibit a wear rate in the range of 0.08 grams to 1.60 grams of mass loss after 6,000 cycles as measured using ASTM G65-04, Procedure A, including all values and ranges therein.

The alloys may be applied to a surface in one or more layers, each layer having an individual thickness of 1 mm to 10 mm, including all values and ranges therein. The overlay may have a total thickness of 1 to 30 mm, including all values and ranges therein. In addition, the width of the individual welds may be in the range of 5 mm to 40 mm, including all values and ranges therein, the width of the total weld overlay may be in the range of 5 mm to 20 feet, including all values and ranges therein.

In one particular aspect, illustrated in FIG. 1, the alloys may be applied to a drill stem, which may include drill pipe 10. Drill pipe 10 may include, for example, seamless tubing used to rotate a drill bit and circulate drilling fluid in oil and gas wells. Drill pipe 10 may be approximately 30 feet long, such as from 10 feet to 60 feet long, including all values and ranges therein, and may be coupled together by means of a tool joint 14. The tool joint 14 may be understood as a coupling element, which may be located on either end 16, 18 of the drill pipe. The tool joint 14 may include tapered threads and/or seating shoulders 19. In one embodiment, one end of the drill pipe 16, 18 may include a male portion 16 of the tool joint, which mates with a second end 18 of an adjoining drill pipe having a female receptacle. For example, the male end may be tapered and fit within a recess provides in the female portion. The ends of the pipes may be coupled together and/or affixed such as by screwing threads together or welding the pipe ends together. Hardbands 30 including, consisting essentially of, or consisting of, the alloys described above may be applied to the tool joint to resist abrasion. The hardband may be applied from the end of the reduction taper to the other external edge (i.e. complete width), including all values and ranges therein, on the tool joint. In addition, the hardband may be applied on the surface of the tool joint around at least a portion of the circumference of the tool joint.

The cooling rate of the deposited alloys may be sufficient to produce iron rich phases, which may include at least 30% by weight of iron once applied. These phases may include alpha-iron and/or gamma-iron phases. The alpha-iron and gamma-iron phases may be in the range of 0.05 µm to 50 µm in size. In addition, the deposited alloys may cool at a cooling rate sufficient to provide boride ($M_2B$, wherein M is a transition metal) phases sized in the range of 0.5 µm to 3 µm, including all values and increments therein. In some embodiments, the metal boride phases may be tetragonal in crystal structure. Furthermore, borocarbide phases may be cubic phases and contain iron, chromium and/or molybdenum transition metals with both boron and carbon present. The borocarbide phases may have a size of 200 nm to 5 µm, including all value and increments therein, such as 200 nm to 500 nm, 0.5 µm to 3 µm, etc. The deposited alloys herein may also resist cracking upon deposition and cooling. That is, little to no cracking may be exhibited by the deposited alloys. For example, when the alloys are applied around the circumference of a drill pipe, less than 2 cracks may form around the circumference of the drill pipe in a direction perpendicular to the pipe diameter.

While not being limited to any particular theory, the boride and/or borocarbide phases may provide relatively hard precipitates within ductile iron rich phases. These alloys may provide abrasive wear resistance from earth materials that may contact the surfaces of the drill pipes as well as metal to metal wear resistance. For oil and gas drilling, most wells may be formed while drilling through casings thus tool joint wear and casing wear are both important properties. Tool joint wear may be optimized through forming very high hardness deposits with hard boride and borocarbide phases within ductile iron rich phases as listed above. Casing wear will be optimized through forming a favorable tribology couple which may be optimized by lowering friction and maximizing resistance to galling. In metallic alloys, valence band electrons are the reactive electrons which actively form external bonds. In the alloys and ranges shown in this application, high fractions of P-group elements are utilized including boron, carbon, and silicon. Since these elements cannot form metallic bonds, they may form covalent bonds in the alloy with the reactive valence band electrons. This may acts to both reduce friction and maximize galling resistance which is favorable for reducing casing wear.

EXAMPLES

The following examples are for purposes of illustration and are not mean to limit the description or claims appended herein.

Alloy Sample Preparation

A number of glass forming iron based formulations were studied and are outlined Table 1, the weight percentages are shown for each alloy studied.

TABLE 1

Weight Percent For the Elemental Constituents of the CF Series Alloys

| Alloy | Fe | Mn | Nb | Cr | B | C | Si |
|---|---|---|---|---|---|---|---|
| CF1 | 74.52 | 0.11 | 5.59 | 14.74 | 3.54 | 1.02 | 0.48 |
| CF2 | 75.22 | 0.11 | 5.59 | 14.74 | 2.99 | 0.87 | 0.48 |
| CF3 | 75.81 | 0.11 | 5.59 | 14.74 | 2.52 | 0.75 | 0.48 |
| CF4 | 70.62 | 0.11 | 5.59 | 19.50 | 2.99 | 0.87 | 0.32 |
| CF5 | 80.07 | 0.12 | 5.59 | 9.21 | 3.54 | 1.03 | 0.44 |
| CF6 | 67.32 | 0.11 | 5.59 | 22.80 | 2.99 | 0.87 | 0.32 |
| CF7 | 79.68 | 0.12 | 5.59 | 9.21 | 3.85 | 1.11 | 0.44 |
| CF8 | 85.98 | 0.10 | 3.62 | 6.41 | 2.75 | 0.80 | 0.34 |

Using high purity elements, 15 g alloy feedstocks of the targeted alloys were weighed out according to the weight percentages provided in Table 1. The feedstock material was then placed into the copper hearth of an arc-melting system. The feedstock was arc-melted into an ingot using high purity argon as a shielding gas. The ingots were flipped several times and remelted to ensure homogeneity. After mixing, the ingots were then cast in the form of a finger approximately 12 mm wide by 30 mm long and 8 mm thick. The density of each ingot was then measured using the Archimedes method by weighing in air and water and the measured densities are provided in Table 2. As shown, the densities are found to vary from 7.32 grams/cm$^3$ to 7.59 g/cm$^3$.

TABLE 2

Density of CF Series Alloys

| Alloy | Density (g/cm$^3$) |
|---|---|
| CF1 | 7.32 |
| CF2 | 7.47 |
| CF3 | 7.40 |
| CF4 | 7.39 |
| CF5 | 7.39 |
| CF6 | 7.36 |
| CF7 | 7.42 |
| CF8 | 7.59 |

Figure 2:
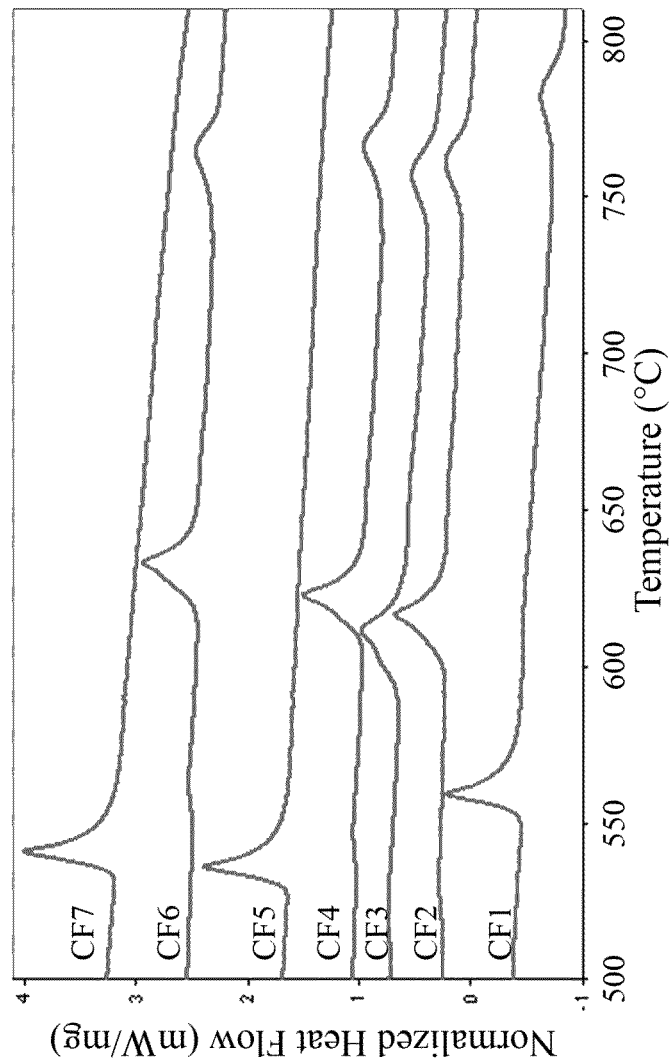
FIG. 2 illustrates an example of a DSC plot showing the glass to crystalline transition peaks for the CF series alloys.

The as-cast ingots were placed in a melt-spinning chamber in a quartz crucible with a hole diameter of ~0.81 mm. The ingots were melted in a ⅓ atm helium atmosphere using RF induction and then ejected onto a 245 mm diameter copper wheel which was traveling at a tangential velocity of 39 m/s. For each sample of melt-spun ribbon material for each alloy, differential thermal analysis and differential scanning calorimetry was done at heating rates of 10° C./minute from room temperature to 1350° C. The presence of metallic glass and verification of the glass forming nature of the targeted alloys can be seen by the glass to crystallization peak(s) in the DSC scans for each alloy as shown in FIG. 2. Additionally, in Table 3, DSC data tabulates the onset temperature, peak temperature and enthalpy for each glass transition. As shown, depending on the alloy chemistry, one to three devitrification events occur for each alloy in the range from 452 to 783° C. and with an enthalpy from −4.9 J/g to −72.3 J/g. In Table 4, the melting including the onset and peak temperatures including the enthalpy of melting are shown for each alloy. As indicated, generally a single melting event was observed in the temperature range of 1137 to 1227° C. Note based on the fluidity of the alloys flowing through the small nozzle and the relatively low melting points, all of the alloys in Table 1, would be expected to be atomizable by a number of methods including gas atomization, water atomization, and centrifugal atomization. The resulting powder could then be sized for laser fusing or PTA weld application with various standard industrial cuts such as +53 to −106 µm, +53 to −150 µm, and +45 to −180 µm.

TABLE 3

Devitrification Data For CF7 Series Alloys

| | Peak 1 | | | Peak 2 | | | Peak 3 | | |
|---|---|---|---|---|---|---|---|---|---|
| Alloy | Onset [° C.] | Peak [° C.] | ΔH [J/g] | Onset [° C.] | Peak [° C.] | ΔH [J/g] | Onset [° C.] | Peak [° C.] | ΔH [J/g] |
| CF1 | 554 | 559 | −38.0 | 601 | 625 | −3.0 | 764 | 783 | −22.3 |
| CF2 | 517 | 533 | −6.7 | 608 | 616 | −34.7 | 745 | 762 | −21.0 |
| CF3 | 599 | 612 | −37.1 | 742 | 757 | −21.8 | — | — | — |
| CF4 | 535 | 549 | −5.3 | 616 | 623 | −38.7 | 750 | 767 | −23.9 |
| CF5 | 531 | 536 | −41.9 | — | — | — | — | — | — |
| CF6 | 550 | 564 | −4.9 | 625 | 633 | −36.4 | 748 | 766 | −23.2 |
| CF7 | 535 | 541 | −42.3 | — | — | — | — | — | — |
| CF8 | 452.5 | 474.5 | −72.3 | 515.0 | 545.0 | −54.7 | | | |

TABLE 4

Melting Data For CF7 Series Alloys

| Alloy | Onset [° C.] | Peak [° C.] | ΔH [J/g] |
|---|---|---|---|
| CF1 | 1169 | 1204 | 126.9 |
| CF2 | 1197 | 1224 | 172.8 |
| CF3 | 1189 | 1220 | 177.2 |
| CF4 | 1198 | 1224 | 134.7 |
| CF5 | 1155 | 1185 | 116.8 |
| CF6 | 1202 | 1227 | 129.8 |
| CF7 | 1137 | 1182 | 110.2 |
| CF8 | 1150 | 1169 | |

Feedstock Production

Figure 3:
FIG. 3 illustrates a picture of an example of a twenty-five pound 1/16" diameter cored wire spool of the CF2 alloy.
Figure 4B:
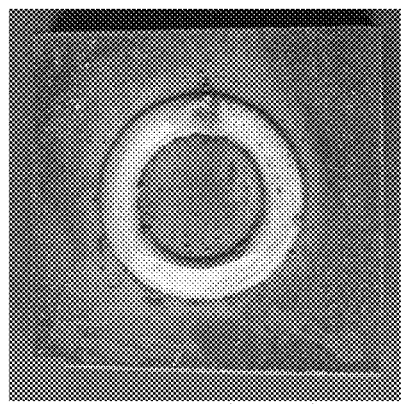
FIGS. 4a, 4b, 4c, and 4d illustrate examples of the dye penetrant inspected overlay circle beads; a) CF6 alloy with no preheat, b) CF6 alloy with 600° F. preheat, c) CF7 alloy with no preheat, d) CF7 with 600° F. preheat. Note that on each circle bead, an area was ground flat for subsequent hardness testing.
Figure 4D:
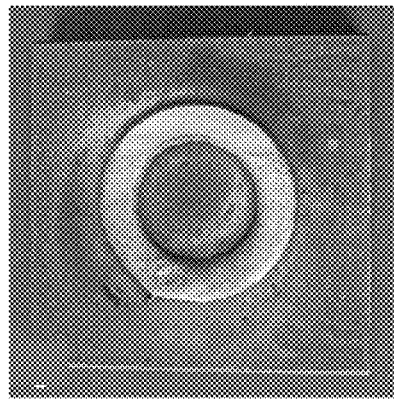
Figure 4A:
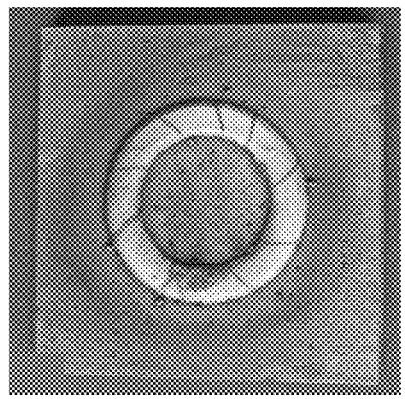
Figure 4C:
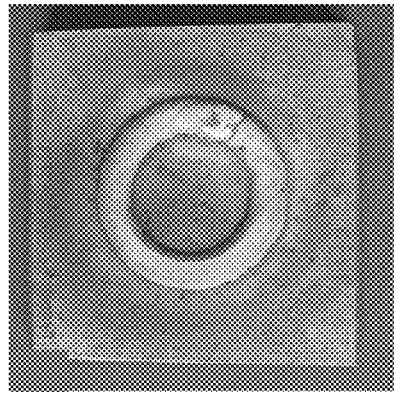

The chemistries of the alloys in Table 1 can be made into powder cored wires containing flux using conventional manufacturing techniques. In this case, conventional steel sheaths are utilized which contain combinations of powders and when the sheath and the powders are melted then the target chemistries are achieved. Various diameters of cored wire can be made in the range of 0.01 to 0.5 inches, including but not limited to all values and increments therein such as 0.045" (1.2 mm), 1/16" (1.6 mm), 7/64" (2.8 mm), 1/8" (3.2 mm), and 3/16" (4.7 mm). In FIG. 3, a picture is shown of a 25 lb powder spool of cored wire at 1/16" diameter at the CF2 target chemistry. The cored wires may be used as feedstock for various welding processes which use wire including gas metal arc-welding (GMAW), metal inert gas (MIG) welding, submerged arc welding (SAW), and open arc welding (OAW). Additionally, stick electrodes of various diameters including but not limited to 0.045", 1/16" (1.6 mm), 5/64" (2.0 mm), 3/32" (2.4 mm), 1/8" (3.2 mm), and 3/16" (4.7 mm) can be manufactured and welded through various hardfacing strategies including shielded metal arc welding (SMAW) or stick welding.

Weld Overlay Deposition

For each targeted chemistry shown in Table 1, 1/16" (1.6 mm) diameter powder cored wires containing flux were manufactured. The wires were welded using a Miller Delta-Fab welder with a Miller 24A four roll wire feeder with 1/16 inch U-Groove and were welded with the weld parameters shown in Table 5. Welding was either done using no cover gas (open arc-welding) or using a 75% Ar-25% $CO_2$ shielding gas (GMAW). Linear beads were welded onto 1×4×½ inch substrates of either A36 or 4140 steel. Circular beads were welded onto 8 by 8 by ½ inch substrates of A36 or 4140 steel. For the circular beads, the base plate was put on the positioner to rotate the plate and the torch was set to oscillate 0.65 inch and to weld in a 2 inch diameter radius with 0.875 wide bead. The weld bead was started and applied until it intersected with the origin, thus completing the continuous bead. All plates were air cooled until ambient temperature was achieved.

TABLE 5

CF Series Weld Parameters

| Welding Values | |
|---|---|
| Current (A) | ~220 |
| Voltage (V) | 23.5-24 |
| Wire Speed (ipm) | 250 |
| Stick Out (in) | 1 |
| Shielding Gas - OAW | None |
| Shielding Gas - GMAW | 75% Ar/25% $CO_2$ |
| Weld preheat | None or 600° F. |
| Torch Controls | |
| Oscillation (in) | 0.65 |
| Slew Time (sec) | 0.4 |
| End Dwells (sec) | 0.05 |
| Cross Step (in) | 0.78 |
| Weld Positioner | |
| Travel Speed (ipm) | 7.6 |

Hardness

Single pass overlays were welded of each alloy in Table 1 with and without a weld preheat. After welding, the resulting overlays were surface ground to ensure smooth parallel surfaces for hardness testing. Hardness was measured with a Newage Model AT130RDB hardness tester using the Rockwell C scale and for each sample six measurements were made. The average hardness of the weld overlays of the alloys is shown in Table 6. As indicated the hardness was found to vary from 47.9 to 64.6 Rc depending on the type of weld, the weld parameters, and the alloy chemistry.

TABLE 6

Hardness of the CF Series Alloys With and Without Preheat

| Alloy | Weld Type | Overlay Passes | Hardness Rockwell C No Preheat | Hardness Rockwell C 600° F. Preheat |
|---|---|---|---|---|
| CF1 | GMAW | 1 | 61.4 | 59.0 |
| CF1 | OAW | 1 | 59.7 | — |
| CF2 | GMAW | 1 | 52.4 | 52.1 |
| CF3 | GMAW | 1 | 50.4 | 49.7 |
| CF3 | OAW | 1 | 47.9 | — |
| CF4 | GMAW | 1 | 58.1 | 55.7 |
| CF4 | OAW | 1 | 56.2 | 55.1 |
| CF5 | GMAW | 1 | 59.8 | 54.6 |
| CF5 | OAW | 1 | 59.5 | 54.5 |
| CF6 | GMAW | 1 | 64.4 | 59.8 |
| CF7 | GMAW | 1 | 60.8 | 57.8 |
| CF7 | OAW | 1 | 64.6 | 56.4 |

TABLE 6-continued

Hardness of the CF Series Alloys With and Without Preheat

| Alloy | Weld Type | Overlay Passes | Hardness Rockwell C No Preheat | Hardness Rockwell C 600° F. Preheat |
|---|---|---|---|---|
| CF8 | GMAW | 1 | 56.8 | 52.2 |
| CF8 | OAW | 1 | 59.0 | 51.8 |

Wear Resistance

Single pass overlays were welded of each alloy in Table 1 without a weld preheat. After welding, the resulting overlays were surface ground to ensure smooth parallel surfaces for wear testing. Wear resistance was measured using a Falex Friction & Wear Test Machine using the ASTM G65-04 Procedure A standard. Note that Procedure A involves testing for a duration of 6000 cycles. The wear resistance results are single measurements of mass loss and are shown in Table 7. As shown, the wear rate varied greatly in the range from 1.58 g to 0.10 g mass loss. Note that the ASTM G-65 testing results in an error from the measurements noted that is in the range of +/−0.02 g mass loss in Procedure A mode.

TABLE 7

ASTM G65-04 Wear Resistance of the CF Series Alloys

| Alloy | Weld Type | Number of Passes | Mass Loss (g) |
|---|---|---|---|
| CF1 | OAW | 1 | 0.25 |
| CF2 | GMAW | 1 | 1.58 |
| CF2 | GMAW | 2 | 1.33 |
| CF3 | OAW | 1 | 0.82 |
| CF4 | GMAW | 1 | 0.34 |
| CF4 | OAW | 1 | 0.49 |
| CF5 | GMAW | 1 | 0.26 |
| CF5 | OAW | 1 | 0.24 |
| CF6 | GMAW | 1 | 0.35 |
| CF6 | GMAW | 2 | 0.26 |
| CF7 | GMAW | 1 | 0.15 |
| CF7 | GMAW | 2 | 0.10 |
| CF7 | OAW | 1 | 0.23 |
| CF7 | OAW | 2 | 0.13 |
| CF8 | GMAW | 1 | 0.23 |
| CF8 | GMAW | 2 | 0.17 |
| CF8 | OAW | 1 | 0.20 |
| CF8 | OAW | 2 | 0.23 |

Crack Resistance

For each alloy in Table 1, circular bead specimens were welded under identical conditions to measure the crack resistance. After welding, crack inspection was done using a dye penetrant inspection method provided by Dynaflux following the standard manufacturer instructions using the C-NF cleaner, the P-HF penetrant, and D-NF developer. Example circle beads are shown in FIGS. 4a through 4d after dye penetrant inspection for the CF6 and CF7 alloys welded with and without a preheat and the presence of cracks can be easily observed. Note that a portion of the weld overlays were surface ground to allow for hardness measurements and that the degree of surface grinding does not have any effect on the number of cracks in a sample. For each alloy, the number of cracks was counted for each circular bead and the results are given in Table 8. As shown, the total number of cracks in each sample varied from 10 to 0 depending on alloy and weld conditions. Note that improved crack resistance was obtained in all of the alloys when welding with a 600° F. preheat since residual stresses could be minimized.

TABLE 8

Crack Count of the CF Series Alloys With and Without Preheat

| Alloy | Weld Type | Overlay Passes | Number of Cracks No Preheat | Number of Cracks 600° F. Preheat |
|---|---|---|---|---|
| CF1 | GMAW | 1 | 5 | 1 |
| CF2 | GMAW | 1 | 1 | 0 |
| CF3 | GMAW | 1 | 1 | 0 |
| CF4 | GMAW | 1 | 1 | 0 |
| CF4 | OAW | 1 | 1 | 0 |
| CF5 | GMAW | 1 | 1 | 0 |
| CF5 | OAW | 1 | 1 | 0 |
| CF6 | GMAW | 1 | 10 | 1 |
| CF7 | GMAW | 1 | 1 | 0 |
| CF7 | OAW | 1 | 1 | 0 |
| CF8 | GMAW | 1 | 1 | 0 |
| CF8 | OAW | 1 | 1 | 0 |

CASE EXAMPLES

Case Example 1

CF7 cored wires were welded using a Miller Delta-Fab welder with a Miller 24A four roll wire feeder with the weld parameters shown previously in Table 5. Welding was either done using no cover gas (open arc-welding) or using a 75% Ar-25% $CO_2$ shielding gas (GMAW) and was done in one pass (single bead) or two passes thick. Linear beads were welded onto 1×4×½ inch substrates of either A36 or 4140 steel. After welding, hardness was measured with a Newage Model AT130RDB hardness tester using the Rockwell C scale and wear resistance was measured using ASTM G65-04 Procedure A. The average hardness of the weld overlays of the CF7 alloy is shown in Table 9 and was found to vary widely with weld parameters yielding Rc hardness from 55.5 to 66.7. Higher hardness from 3 to 6 Rc points was obtained when welded onto the 4140 substrate due to pick-up of additional carbon, molybdenum, and chromium from the 4140 substrate which has a higher alloy content compared to A36. Additionally, as shown, the hardness increases when a second weld bead is applied over the first due to the effects of reduced dilution in the second overlay pass. The changes in hardness directly affect the dry sand abrasion resistance as shown by the wear resistance mass loss values in Table 9. With higher hardness, higher wear resistance is obtained with mass losses from 0.26 to 0.10 g.

TABLE 9

Weld Parameter Effect on CF7 Alloy Hardness/Wear Resistance

| Alloy | Weld Type | Overlay Passes | Substrate Type | Hardness Rockwell C | Wear Resistance (mass loss g) |
|---|---|---|---|---|---|
| CF7 | OAW | 1 | A36 | 55.5 | 0.23 |
| CF7 | OAW | 1 | A36 | 58.6 | 0.26 |
| CF7 | OAW | 2 | A36 | 63.3 | 0.13 |
| CF7 | OAW | 1 | 4140 | 66.7 | 0.12 |
| CF7 | OAW | 1 | 4140 | 65.3 | 0.10 |

Case Example 2

Figure 5A:
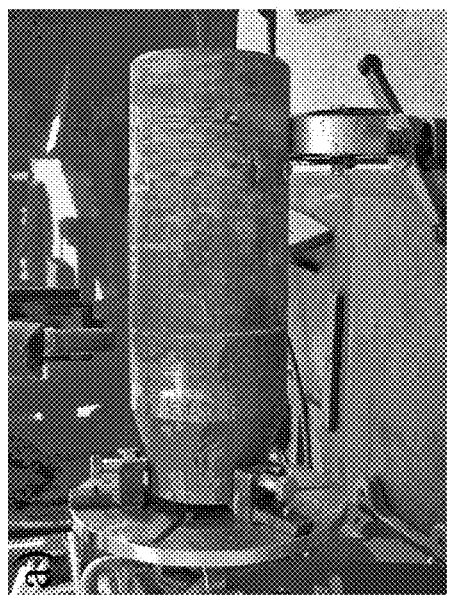
FIGS. 5a and 5b illustrates an example of a welding set-up utilized to weld 6 5/8 inch diameter tool joint using the CF7 cored wire; a) Before weld overlay was applied, b) After weld overlay hardfacing.
Figure 5B:
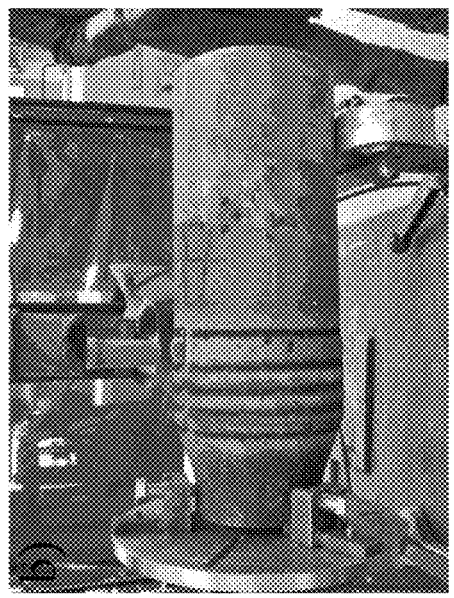
Figure 6:
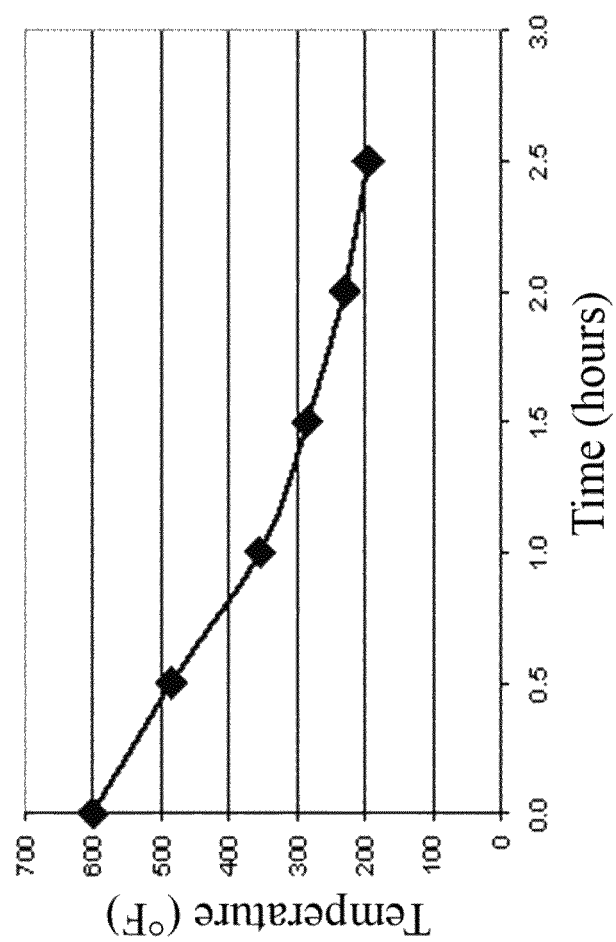
FIG. 6 illustrates an example of a cooling curve for the CF7 tool joint following welding with the 550° F. preheat.
Figure 7:
FIG. 7 illustrates an example of a cleaned welded tool joint using CF7 overlay with a 600° F. preheat.

Using 1/16" diameter cored wire of the CF7 alloy, weld beads were applied to 6⅝ inch diameter tool joints used for connecting drill pipes in a drill stem for oil well drilling. Prior to welding, the tool joints were preheated in a propane furnace to 550° F. and 600° F. The preheated tool joint was mounted on the weld positioner with the opposite end supported on rollers as shown in FIG. 5a. Using the standard OAW process, and the parameters in Table 5, the CF7 single pass weld overlay was applied to the surface of the tool joint. The first weld bead was applied flush with the shoulder of each tool joint and welding was repeated until four adjacent passes or beads were applied (see FIG. 5b). For each weld bead, welding was started and applied until it intersected with the origin, thus completing the continuous bead. The beads were welded in quick succession allowing only enough time to step the torch over to the next position, and as a result the interpass temperature was maintained close to the targeted preheat for all three tool joints. After welding, the temperature at the surface of the overlay was measured at the center of the overlaid section using a two-color optical pyrometer. In FIG. 6, a cooling curve is shown for the CF7 tool joint following welding with a 550° F. preheat. After the tool joints had cooled to ambient temperature, the weld spatter and residue was removed by a light hand grinding. An example cleaned tool joint welded with CF7 overlay with a 600° F. preheat is shown in FIG. 7.

Figures 8A, 8B:
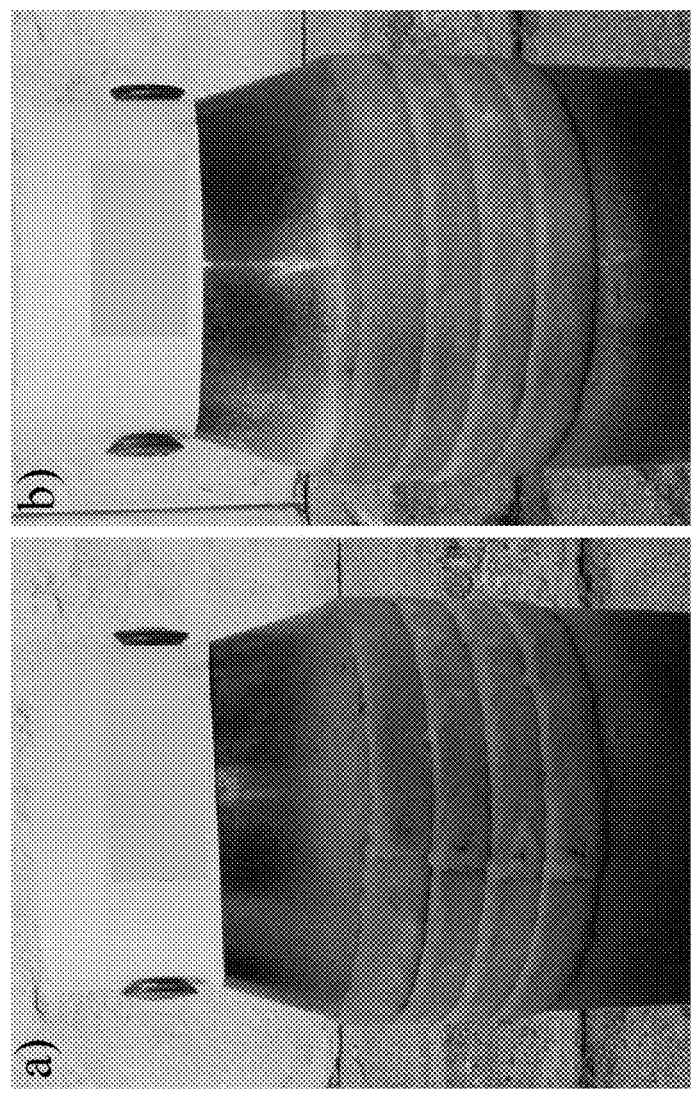
FIGS. 8a and 8b illustrates photographs of an example of a CF7 weld overlay on the tool joint showing dye penetrant inspection after welding with a 550° F. preheat; a) Front side showing weld start/finish seam, b) Back side showing continuous bead.

After light surface cleaning, the weld overlays were inspected to determine the number of cracks using the Dynaflux dye penetrant according to the procedure outlined previously. In FIGS. 8a and 8b, photographs of the CF7 weld overlay on the tool joint showing dye penetrant inspection after welding with a 550° F. preheat. As shown, no cracks were observed in the weld overlay. Additionally, for both the 550° F. and 600° F. preheat samples, no cracks were found using dye penetrant inspection.

The weld overlay on the tool joint was surface machined to provide a smooth surface to measure Rockwell C hardness in Table 10. Hardness values with an average of six measurements were taken symmetrically around the circumference of the weld bead while avoiding the ~2 inch wide zone near the weld overlay seam. For the 600° F. preheat sample, the hardness of each weld bead is shown in Table 10. As shown, relatively high average hardness was obtained with individual measurements from Rc 60.5 to 65.1.

TABLE 10

Rockwell C Hardness of Weld Overlay on The Tool Joint

| | Weld Overlay Bead Number | | | |
| --- | --- | --- | --- | --- |
| | 1 | 2 | 3 | 4 |
| Measurement 1 | 63.3 | 62.6 | 63.7 | 63.4 |
| Measurement 2 | 61.1 | 64.2 | 60.5 | 65.1 |
| Measurement 3 | 61.4 | 62.1 | 64.2 | 63.5 |
| Measurement 4 | 61.3 | 63.1 | 63.2 | 64.2 |
| Measurement 5 | 62.7 | 62.5 | 63.1 | 64.1 |
| Measurement 6 | 62.6 | 63.7 | 64.6 | 65.1 |
| Average Hardness (Rc) | 62.1 | 63.0 | 63.2 | 64.2 |

Case Example 3

Figure 9A:
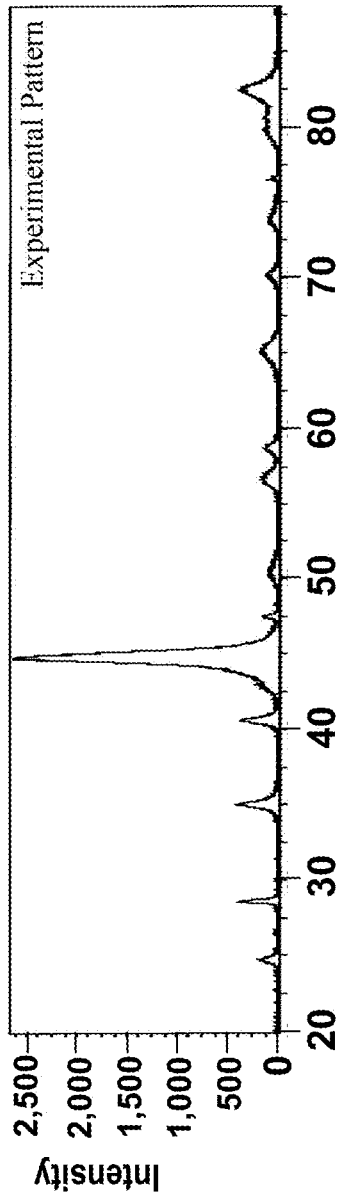
FIGS. 9a and 9b illustrates an example of an X-Ray diffraction scan of the CF7 open-arc overlay sample; a) Experimental pattern, b) Rietveld refined pattern.
Figure 9B:
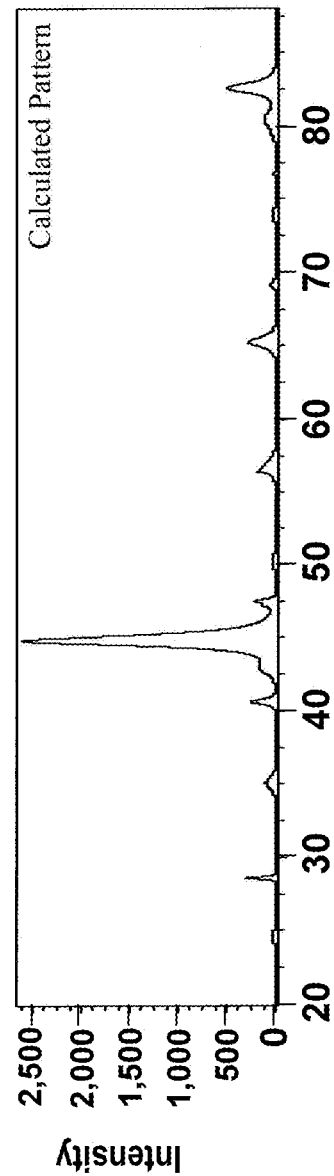

The microstructure of the weld overlay deposits were analyzed using X-ray diffraction to primarily identify the phases present. From a double pass open-arc CF7 weld overlay ground sample, a ~1" square was cut off and prepared for X-ray diffraction. X-ray diffraction scans were then taken using a copper target with a scan range from 20 to 90 degrees two theta, a step size of 0.01 degrees and at a scanning rate of 0.6 degrees/minute. Note prior to X-ray diffraction, a small amount of silicon powder was placed on top of the overlay sample and pressed down so that the height of the silicon matched the height of the overlay. The experimental X-ray diffraction diagram was analyzed using Rietveld analysis to identify the phases present. In FIGS. 9a and 9b, an X-ray diffraction diagram is shown of the CF7 double pass open-arc sample. After Rietveld refinement, the phases were identified in the alloy and the phase information including the crystal structure, space group, and lattice parameters are shown in Table 11. The results show that a complex metal boride (i.e. $M_2B$) exists in a ductile matrix consisting of both $\alpha$-Fe and $\gamma$-Fe phases.

TABLE 11

Phases Identified/Space Group/Lattice Parameters For CF7 Overlay

| Identified Phase | Crystal Structure | Space Group | Lattice Parameter (Å) |
| --- | --- | --- | --- |
| alpha-Fe | Cubic | Im-3m | a = 2.862 |
| gamma-Fe | Cubic | Fm-3m | a = 3.846 |
| $M_2B$ | Tetragonal | I4/mcm | a = 5.120 |
| | | | c = 4.213 |

Case Example 4

Figures 10A, 10B:
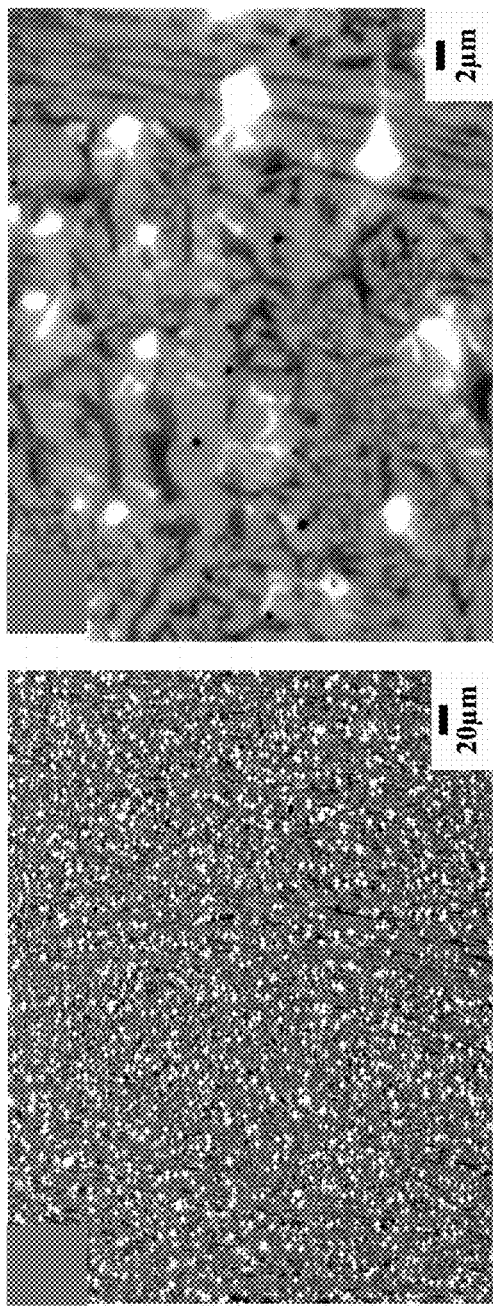
FIGS. 10a and 10b illustrates an example of an SEM backscattered electron micrographs showing the GMAW weld structure of the CF7 alloy; a) Low magnification showing the distribution of phases and microstructure scale, b) High magnification of the microstructure showing the morphology of individual phases.

To further examine the weld overlay structure, scanning electron microscopy (SEM) was done on selected CF7 weld overlay samples. Samples of weld overlay were cut out using wire electro-discharge machining (EDM). The resulting metallographic mount was ground and polished using appropriate media following standard metallographic practices. The structure of the sample was observed using a Zeiss MA-10 scanning electron microscope with an electron beam energy of 20.00 kV, a filament current of 2.5 A and a spot size setting of 720 at a working distance of 16.00 mm. SEM backscattered electron micrographs are shown at two different magnifications for the CF7 GMAW sample in FIGS. 10a and 10b. In these Figures, it can be seen that the matrix is made up of two iron rich phases consistent with the $\alpha$-Fe and $\gamma$-Fe phases identified in the X-ray diffraction scans for the CF7 alloy. The overall scale of the microstructure is very fine for a weld overlay and is in the micron/submicron range. As can be seen, a fine distribution of a 0.5 to 5 µm cubic shaped borocarbide precipitates can be found consistent with the identified $M_2B$ phase in the CF7 X-ray diffraction scan. Note that EDS studies of the cubic phase indicate that this phases contains primarily iron, chromium, and molybdenum transition metals with both boron and carbon present which is why it is best considered a complex borocarbide phase. Also, note that an unidentified borocarbide phase typically from 200 to 500 nm thick is found in the last liquid to solidify regions. Since the volume fraction of this phase is small, it may be expected that it may not have been identified in the X-ray diffraction scans.

Case Example 5

To produce wire for GMAW or OAW welding, 1/16" diameter cored wires were fabricated using conventional wire manufacturing technology of the CF8 alloy listed in Table 1. The cored wire was made by putting in a powder blend into the core of a steel strip which was then mechanically wrapped and drawn to form a cored wire. When melted during welding, the powders and the metal sheath combine in the liquid melt to hit the CF8 chemistry.

After the fabrication of each batch of cored wire, a wire sample that was 10' in length was cut from a wire spool and sent to an independent third party NADCAP certified laboratory for chemical analysis. The composition of elements was measured by Inductively Coupled Plasma (ICP) analysis with the ICP data in weight percent shown in Table 12. The wire composition consisted of seven elements and can be characterized as six elements mixed into iron as additives. As shown in Table 12, the composition of the wire varies as a function of batch and along the length of the wire. This level of variation shown in a short segment of wire is representative of each targeted alloy chemistry listed in Table 1. Note that for each of the wires produced in Table 12, crack free high hardness deposits were produced consistent with the results in the main body of this document.

TABLE 12

CF8 Batch ICP Chemistry Data

| Element | Target | Batch a | Batch b | Batch c |
|---------|--------|---------|---------|---------|
| B  | 2.75  | 4.11 | 2.66 | 2.57 |
| C  | 0.80  | 1.15 | 0.83 | 0.79 |
| Cr | 6.41  | 8.94 | 6.82 | 6.59 |
| Mn | 0.10  | 0.27 | 0.23 | 0.27 |
| Nb | 3.62  | 5.84 | 3.76 | 3.99 |
| Si | 0.34  | 0.32 | 0.25 | 0.27 |
| Fe | 85.98 | Bal  | Bal  | Bal  |

What is claimed is:

1. A method of applying a hardband to a drill pipe containing a tool joint circumference, comprising:
   welding around at least a portion of said tool joint circumference a hardbanding alloy comprising iron and manganese present in the range of 67 to 87 weight percent (wt. %), niobium and chromium present in the range of 9 to 29, and boron, carbon and silicon present in the range of 3 to 6.5 wt. %; and
   cooling said hardbanding alloy, wherein said hardbanding alloy as welded exhibits a hardness of 45 Rc to 70 Rc and a wear rate in the range of 0.08 grams to 1.60 grams of mass loss after 6,000 cycles as measured using ASTM G65-04, Procedure A;
   wherein said hardbanding alloy further comprises:
   iron present in the range of 67.0 to 86.0 wt. %;
   manganese present in the range of 0.05 to 0.3 wt. %;
   niobium present in the range of 3.5 to 6.0 wt. %;
   chromium present in the range of 6.0 to 23.0 wt. %;
   boron present in the range of 2.5 to 4.5 wt. %;
   carbon present in the range of 0.5 to 2 wt. %; and
   silicon present in the range of 0.2 to 0.5 wt. % wherein said alloy contains up to 2.0 wt. % of an elemental impurity.

2. The method of claim 1 further comprising preheating a tool joint at a temperature of 275° C. or greater for a period of 0.01 hours to 100 hours.

3. The method of claim 1, wherein said hardbanding alloy is cooled at a rate sufficient to produce alpha-iron and/or gamma-iron phases in the range of 0.05 μm to 50 μm in size.

4. The method of claim 1, wherein said hardbanding alloy further comprises:
   iron present in the range of 67.3 to 86.0 wt. %;
   manganese present in the range of 0.10 to 0.27 wt. %;
   niobium present in the range of 3.6 to 5.9 wt. %;
   chromium present in the range of 6.4 to 22.9 wt. %;
   boron present in the range of 2.5 to 4.2 wt. %;
   carbon present in the range of 0.7 to 1.2 wt. %; and
   silicon present in the range of 0.25 to 0.5 wt. %
   wherein said alloy contains up to 2.0 wt. % of an elemental impurity.

5. The method of claim 1, wherein said hardbanding alloy exhibits metal boride phases ($M_2B$, wherein M is a transition metal) sized in the range of 0.5 μm to 5 μm.

6. The method of claim 1, wherein said hardbanding alloy further comprises exhibits borocarbide phases containing iron, chromium and/or molybdenum transition metals.

7. The method of claim 1, wherein said tool joint exhibits a hardness of less than 100 $R_B$.

8. The method of claim 1, wherein said tool joint comprises iron present at 95 atomic percent (at %) or more, carbon present at 0.2 atomic percent to 0.5 atomic percent, and manganese present in the range of 0.5 atomic percent to 1.5 atomic percent.

9. A drill pipe, comprising:
   a tool joint having a circumference; and
   a hardband disposed around at least a portion of said tool joint circumference, wherein said hardband includes a hardbanding alloy comprising iron and manganese present in the range of 67 to 87 weight percent (wt. %), niobium and chromium present in the range of 9 to 29 wt. %, and boron, carbon and silicon present in the range of 3 to 6.5 wt. %, wherein said hardbanding alloy exhibits a hardness of 45 Rc to 70 Rc and a wear rate in the range of 0.08 grams to 1.60 grams of mass loss after 6,000 cycles as measured using ASTM G65-04, Procedure A;
   wherein said hardbanding alloy further comprises:
   iron present in the range of 67.0 to 86.0 wt. %;
   manganese present in the range of 0.05 to 0.3 wt. %;
   niobium present in the range of 3.5 to 6.0 wt. %;
   chromium present in the range of 6.0 to 23.0 wt. %;
   boron present in the range of 2.5 to 4.5 wt. %;
   carbon present in the range of 0.5 to 2 wt. %; and
   silicon present in the range of 0.2 to 0.5 wt. % wherein said alloy contains up to 2.0 wt. % of an elemental impurity.

10. The drill pipe of claim 9, wherein said hardbanding alloy exhibits alpha-iron and/or gamma-iron phases in the range of 0.05 μm to 50 μm in size as applied to said tool joint.

11. The drill pipe of claim 9, wherein said hardbanding alloy further comprises:
   iron present in the range of 67.0 to 86.0 wt. %;
   manganese present in the range of 0.05 to 0.3 wt. %;
   niobium present in the range of 3.5 to 6.0 wt. %;
   chromium present in the range of 6.0 to 23.0 wt. %;
   boron present in the range of 2.5 to 4.5 wt. %;
   carbon present in the range of 0.5 to 2 wt. %; and
   silicon present in the range of 0.2 to 0.5 wt. %
   wherein said alloy contains up to 2.0 wt. % of an elemental impurity.

12. The drill pipe of claim 9, wherein said hardbanding alloy further comprises:
   iron present in the range of 67.3 wt. % to 86.0 wt. %;
   manganese present in the range of 0.10 to 0.27 wt. %;
   niobium present in the range of 3.6 to 5.9 wt. %;
   chromium present in the range of 6.4 to 22.9 wt. %;
   boron present in the range of 2.5 to 4.2 wt. %;
   carbon present in the range of 0.7 to 1.2 wt. %; and
   silicon present in the range of 0.25 to 0.5 wt. %
   wherein said alloy contains up to 2.0 wt. % of an elemental impurity.

13. The drill pipe of claim 9, wherein said hardbanding alloy exhibits an onset melting temperature of 1137° C. to 1202° C. as determined by differential scanning calorimetry or differential thermal analysis measured at 10° C. per minute.

14. The drill pipe of claim 9, wherein said tool joint exhibits a hardness of less than 100 $R_B$.

15. The drill pipe of claim 9, wherein said hardbanding alloy exhibits metal boride phases ($M_2B$, wherein M is a transition metal) sized in the range of 0.5 μm to 5 μm.

16. The drill pipe of claim 9, wherein said hardbanding alloy further comprises exhibits borocarbide phases containing iron, chromium and/or molybdenum transition metals.

17. The drill pipe of claim 9, wherein said drill pipe comprises iron present at 95 atomic percent (at %) or more, carbon present at 0.2 atomic percent to 0.5 atomic percent, and manganese present in the range of 0.5 atomic percent to 1.5 atomic percent.

* * * * *